US011070500B2

(12) United States Patent
Phan et al.

(10) Patent No.: US 11,070,500 B2
(45) Date of Patent: Jul. 20, 2021

(54) THIRD-PARTY INTEGRATION IN ACTIVITY FEEDS

(71) Applicant: Dropbox, INC., San Francisco, CA (US)

(72) Inventors: Daniel Phan, Seattle, WA (US); Flora Ellis, Seattle, WA (US); Nandan Sawant, San Francisco, CA (US); Maxim Wittek, Seattle, WA (US); Jason Perez, San Francisco, CA (US); Amy Sung, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 16/692,701

(22) Filed: Nov. 22, 2019

(65) Prior Publication Data

US 2021/0160201 A1    May 27, 2021

(51) Int. Cl.
*G06F 15/173* (2006.01)
*H04L 12/58* (2006.01)
*H04L 29/06* (2006.01)
*H04L 29/08* (2006.01)

(52) U.S. Cl.
CPC ............ *H04L 51/046* (2013.01); *H04L 67/20* (2013.01); *H04L 67/40* (2013.01)

(58) Field of Classification Search
CPC ........ H04L 51/046; H04L 67/20; H04L 67/40
See application file for complete search history.

(56) References Cited

U.S. PATENT DOCUMENTS

| | | | |
|---|---|---|---|
| 9,015,239 B2 | 4/2015 | Banatwala et al. | |
| 9,063,912 B2 | 6/2015 | Siebert, Jr. et al. | |
| 9,258,375 B2 | 2/2016 | Bechtel et al. | |
| 9,691,051 B2 | 6/2017 | Rexer et al. | |
| 9,699,625 B2 | 7/2017 | Kaplinger et al. | |
| 2012/0259675 A1 | 10/2012 | Roehrs et al. | |
| 2014/0101248 A1 | 4/2014 | Felder et al. | |
| 2016/0055215 A1 | 2/2016 | Kauwe | |
| 2017/0090704 A1* | 3/2017 | Hu | G06F 3/0484 |
| 2018/0139300 A1 | 5/2018 | Larabie-Belanger | |

* cited by examiner

*Primary Examiner* — Thanh T Nguyen
(74) *Attorney, Agent, or Firm* — Polsinelli PC (57) ABSTRACT

The present technology can provide a mechanism for viewing activities occurring in third-party services with respect to shared content items managed by the content management system. The activities occurring in the third-party services are visible in an activity feed associated with the content management system based on user permissions at the third-party services.

18 Claims, 8 Drawing Sheets

THIRD-PARTY INTEGRATION IN ACTIVITY FEEDS

TECHNICAL FIELD

The present technology pertains to third-party integration in activity feeds, and more particularly, to third-party integration in activity feeds for activities that occur at third-party services with respect to content items associated with a content management system.

BACKGROUND

Team members interact through a plurality of different services as each service may perform one aspect of collaboration better than other services. For example, team members will use email to create a team communication, or to communicate with those outside of a team, and sometimes for intra-team communication as well. Team members may also utilize a topic-based collaboration service (e.g., SLACK, WEBEX TEAMS, etc.) where team members can conduct an electronic chat regarding a topic. Team members may also utilize a video conference service to conduct video meetings and to share documents or screens. Team members may also utilize a document management service (e.g., DROPBOX, etc.) to save content items in a location that is accessible to all team members. Team members may also utilize web hosted documents for simultaneous interaction with a document (e.g. GOOGLE DOCS, DROPBOX PAPER, etc.).

Interacting through all of these different services provides advantages of utilizing the best service available for the specific type of interactions but has the disadvantage of having to separately log in to all of these services in order to interact with team members.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The present technology addresses the need in the art for an activity feed that can incorporate activities occurring on a plurality of third-party services with respect to content items associated with a content management system. When a user views activities associated with a content item, the activities typically pertain to activities that occur at the content management system. These activities can be shown through an activity feed associated with the content item when the content item is being viewed via the content management system. However, more and more users are working with their content items using many different third-party services/platforms. For example, a user may share a content item through a messaging application, such as Slack. As another example, a user may provide a link to a content item in a meeting invite, such as a Zoom meeting. This type of activity is not currently shown in the activity feed for a content item because the content management system wasn't previously aware of activities occurring at third-party services.

The present technology incorporates activities at third-party services for a content item in the activity feed. For example, if a user shares a content item through a third-party messaging application, the activity feed will reflect this information as well as any information about a container (e.g., channel or chat room) through which the content item was shared (e.g., by providing a link to the channel/chat room). A container may be any user interface, workspace, or other environment in an application associated with a third-party service in which a content item of the content management system can be provided, such as a particular communication channel (e.g., such as SLACK), an audio/visual/screen sharing meeting or a meeting invitation (e.g., such as ZOOM), a workflow (e.g., such as TRELLO), or any other third-party platform environment in which a content item of the content management system can be provided.

However, in those situations, the information about the container at the third-party service may not be accessible to some users who have access to the content item. For example, a user who has access to the content item may not necessarily have access to the third-party chat room through which the content item was shared. In these cases, the activity feed for that user may show redacted information about the activity (e.g., activity indicates that the content item was shared through the third-party service without indicating a specific chat room or providing a link to the chat room).

The present technology can provide a mechanism for viewing activities occurring at third-party services with respect to shared content items managed by the content management system. The activities occurring in the third-party services may be visible in an activity feed associated with the content management system, where each user of the content management system may have access to information that the user also has access to at the respective third-party services.

The present technology can address current problems in the art by making it easier to view activities with respect to a content item managed by a content management system, even if the activities have occurred on different third-party services. In this way, the present technology requires fewer burdens on both a computing system (by needing to navigate to and render fewer interfaces) and a viewing user (by reducing the number of steps they need to perform).

Figure 1:
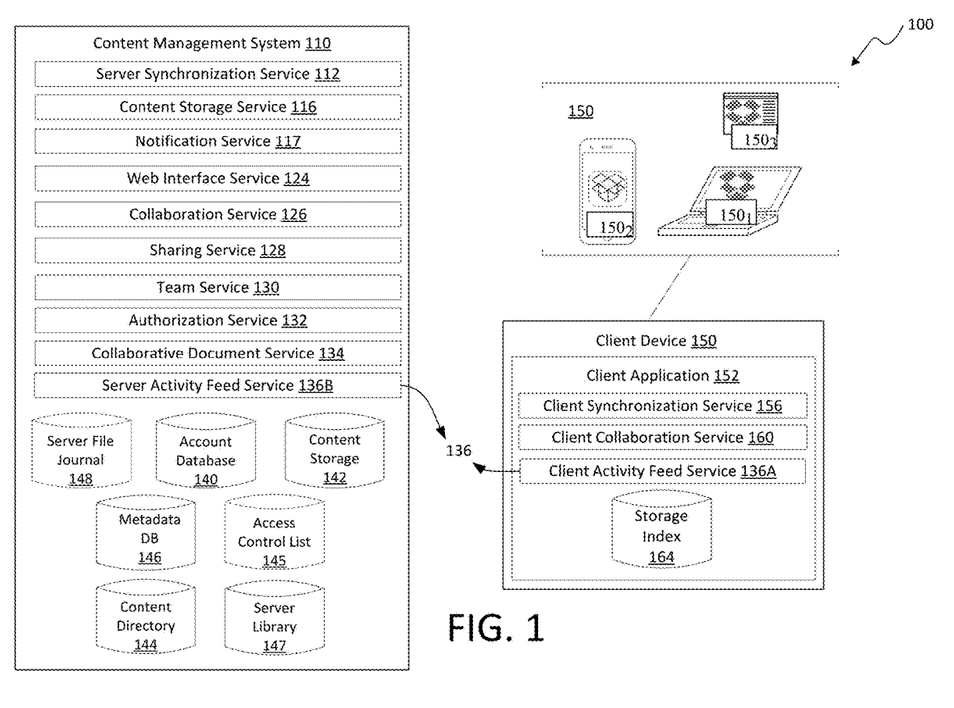
FIG. 1 shows an example embodiment of a content management system and client devices in accordance with some aspects of the present technology.

In some embodiments, the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g., various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases, such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree-like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments, the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure and can appear as a folder within a folder for the account. As addressed above, the directory structure is merely a comfortable navigation structure for users but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device 150$_1$ is a computing device having a local file system accessible by multiple applications resident thereon. Client device 150$_2$ is a computing device wherein content items are only accessible to a specific application or by permission given by the specific application, and the content items are typically stored either in an application specific space or in the cloud. Client device 150$_3$ is any client device accessing content management system 110 via a web browser and accessing content items via a user interface. While example client devices 150$_1$, 150$_2$, and 150$_3$ are depicted in form factors such as a laptop, mobile device, or web browser, it should be understood that the descriptions thereof are not limited to devices of these example form factors. For example a mobile device such as client 150$_2$ might have a local file system accessible by multiple applications resident thereon, or client 150$_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments, client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management storage service 116. In some embodiments, client synchronization service 156 can perform some functions of content management storage service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments, a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either user interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments, content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments, content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments, this can be managed by requiring two users access a content item through a user interface and there they can work on the same copy of the content item at the same time.

Collaboration Companion Interface

In some embodiments, client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces. Certain software applications can access content storage 142 via an application programming interface (API) on behalf of a user. For example, a software package such as an application running on client device 150, can programmatically make API calls directly to content management system 110 when a user provides authentication credentials, to read, write, create, delete, share, or otherwise manipulate content.

Activity Feed

System 100 can also include activity feed service 136 (which can include client activity feed service 136A at client device 150 and/or server activity feed service 136B at content management system 110). Activity feed service 136 may be configured to provide activity data to be presented in activity feed interface 414 (see FIG. 4) at client device 150. The activity data can be descriptive of various activities at one or more third-party services 202 (see FIG. 2A) with respect to content items managed by content management system 110. Activity data can indicate that an action/interaction related to the content item has occurred at third-party service 202 (e.g., the content item was shared). Third-party services 202 may include a collaborative service, messaging service, meeting service, a video service, a workflow service, etc. that may be in the form of software applications, web services provided though HTML applications, etc. In some examples, activities at third-party services 202 may occur in containers at third-party services 202.

Activity feed service 136 may contact one or more third-party services 202 through an application programming interface (API) and provide a user's credentials to obtain data about activities at third-party services 202 with respect to content items managed by content management system 110. In some embodiments, data regarding an activity may be received by a metaserver at content management system 110, which may then record the data at server library 147 of content management system 110, which may index and query a stream of activities to include activities from third-party services 202. In some embodiments, activity feed service 136 can also be part of user interface service 124 whereby when client device 150 accesses content management system 110 via user interface 404 (See FIG. 4).

A user can view or manipulate content that the user's account of content management system 110 has access to via a user interface generated and served by user interface service 124. For example, the user can navigate in a web browser to a web address provided by content management system 110. Changes or updates to content in content storage 142 made through the user interface, such as uploading a new version of a content item, can be propagated back to other client devices associated with the user's account. For example, multiple client devices, each with their own client software, can be associated with a single account, and content items in the account can be synchronized between each of the multiple client devices.

Client device 150 can connect to content management system 110 on behalf of a user. A user can directly interact with client device 150, for example, when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party service, such as a web browser, that resides on client device 150 and is configured to communicate with content management system 110. In various implementations, client-side application 152 can present a user interface (UI) for a user to interact with content management system 110. For example, the user can interact with content management system 110 via a file system explorer integrated with the file system or via a webpage displayed using a web browser application.

In some embodiments, client application 152 can be configured to manage and synchronize content for more than one account of content management system 110. In such embodiments, client application 152 can remain logged into multiple accounts and provide normal services for the multiple accounts. In some embodiments, each account can appear as a folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

Figure 2A:
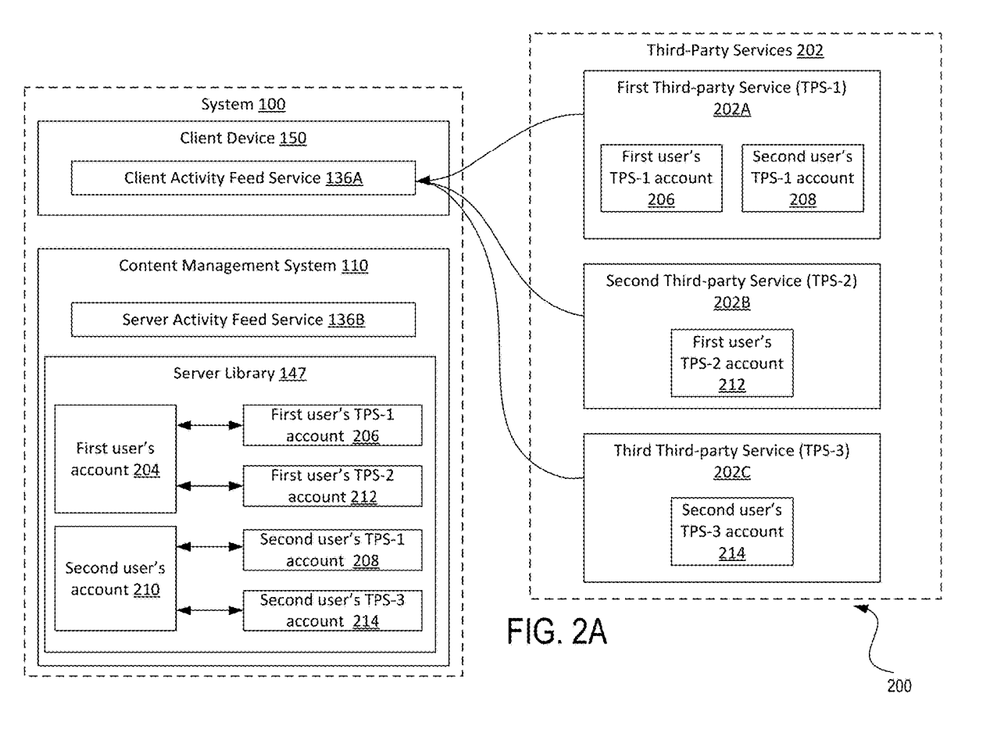
FIG. 2A shows an example system embodiment of the content management system and third-party services in accordance with some aspects of the present technology.

FIG. 2A illustrates example system 200 where client activity feed service 136A is in communication with third-party services 202, namely, first third-party service (TPS-1) 202A, second third-party service (TPS-2) 202B, and third third-party service (TPS-3) 202C (referenced generally as 202), wherein content management system 110 may receive communications from TPS-1 202A, TPS-2 202B, TPS-3 202C regarding activities at TPS-1 202A, TPS-2 202B, TPS-3 202C. While FIG. 2A illustrates three third-party services, TPS-1 202A, TPS-2 202B, TPS-3 202C, it should be understood that this is for example only. Furthermore, while FIG. 2A illustrates that client activity feed service 136A at client device 150 can be in communication with TPS-1 202A, TPS-2 202B, TPS-3 202C, it should be understood that server activity feed service 136B at content management system 110 may be in communication with TPS-1 202A, TPS-2 202B, TPS-3 202C in addition to, or alternatively to, client activity feed service 136A.

Generally, content management system 110 may communicate with third-party services 202, such as through an API, to collect activity data from third-party services 202 associated with content items managed by content management system 110. The activity data may be descriptive of activities at third-party services 202 associated with content items under management of content management system 110.

Content management system 110 may subscribe to third-party services 202 via webhooks and/or event APIs to be notified of activity data pertaining to a content item. When an activity at third-party service 202 contains a reference to a particular content item managed by content management system 110, third-party service 202 may notify content management system 110 about the activity and activity data associated with the activity. Activity data may include any information associated with an activity related to a content item, such as information about a user associated with the activity, when the activity occurred, what container the activity occurred in, what kind of activity occurred, and other data that can be used to identify the content item the activity is associated with (e.g., a content item identifier).

In some embodiments, sharing content items at third-party services 202 may include sharing a link in a container of third-party service 202, dragging and dropping the content item into a container of third-party service 202, or mentioning the content item at third-party service 202. Activity data associated with the sharing activity can indicate to content management system 110 that the activity is associated with a particular content item. In some examples, the activity data can include information associated with other users with whom the content item is shared (e.g., other users with access to the container of third-party service 202).

In some embodiments, when third-party service 202 is a messaging service, activity data can be descriptive of any activity relating to a content item and occurring on the messaging service, such as sharing and/or opening a content item within a particular container (e.g., a particular chat stream or channel), comments made with respect to a content item, or creating a content item within the container.

In some embodiments, when third-party service 202 is a virtual conferencing service, activity data can be descriptive of any activity relating to a content item and occurring on the virtual conferencing service, such as sharing and/or opening a content item in the virtual conferencing session, comments made with respect to a content item, creating a content item, attaching a content item to a meeting invitation, and discussions referencing the content item. Furthermore, when the container is a screen share activity or any activity wherein the number of participants is fixed, content management system 110 may further receive activity data regarding a list of users that participated in the activity at third-party service 202 and store the list of users as an array at server library 147 at content management system 110. The list of users may be locally stored at server library 147 if it is fixed so that content management system 110 may have local access to such information to quickly determine which users are associated with a particular container.

As shown in FIG. 2A, content management system 110 may maintain a mapping, such as at server library 147, between user accounts at third-party services 202 with user accounts at content management system 110. In some embodiments, content management system 110 records the mapping of a user account at content management system 110 and a user account at a third-party service 202 when the user account at content management system 110 explicitly provides this information to link their account at third party service 202 with their account at content management system 110. In some embodiments, content management system 110 can infer or learn a mapping between a user account at third-party service 202 and the user account at content management system 110 when content management system 110 determines that a user account at third-party service 202 is associated with an email address, or other user identifier, known to be associated with the user account at content management system 110.

As further illustrated in FIG. 2A, the mapping may indicate first user's account 204 at content management system 110 is associated with first user's TPS-1 account 206 212 at first third-party service 202A and with first user's TPS-2 account 212 at second third-party service 202B. Additionally, second user's account 210 at content management system 110 is associated with second user's TPS-1 account 208 at first third-party service 202A and second user's TPS-3 account 214 at third third-party service 202C. While FIG. 2A illustrates four associations between user accounts, it should be understood that this is for example only and that there can be any number of user accounts at both content management 110 and third-party services 202 that may be associated with one another in various combinations.

The mapping information stored at server library 147 is useful in determining whether and how much of the activity data can be surfaced to a user account at content management system 110. As noted above, content management system 110 can determine that a content item under its management is associated with activity at third-party service 202, and can present activity data related to the content item in a user interface such as the user interface illustrated in FIG. 4. However, the amount of detail content management system 110 presents to a user account of content management system 110 may depend on what level of access a corresponding user account at third-party service 202 has. Certain activity information obtained about activities at third-party services 202 may be made available to only certain users at content management system 110 that would have otherwise had access to the activity information at third-party services 202 as determined by the mapping reflected in server library 147.

Content management system 110 can determine whether a user account of content management system 110 has access to the activity information by requesting access levels to containers associated with the corresponding user account at third-party service 202 from third-party service 202. In some embodiments, content management system 202 can store access level information as a mapping between users of third-party service 202 and containers that the users of third-party service 202 are a part of. Once the mapping indicates that a user account at content management system 110 has access to certain activities at third-party service 202, the user account at content management system 110 may have access to such activities in an activity feed associated with the content item at content management system 110.

Figure 2B:
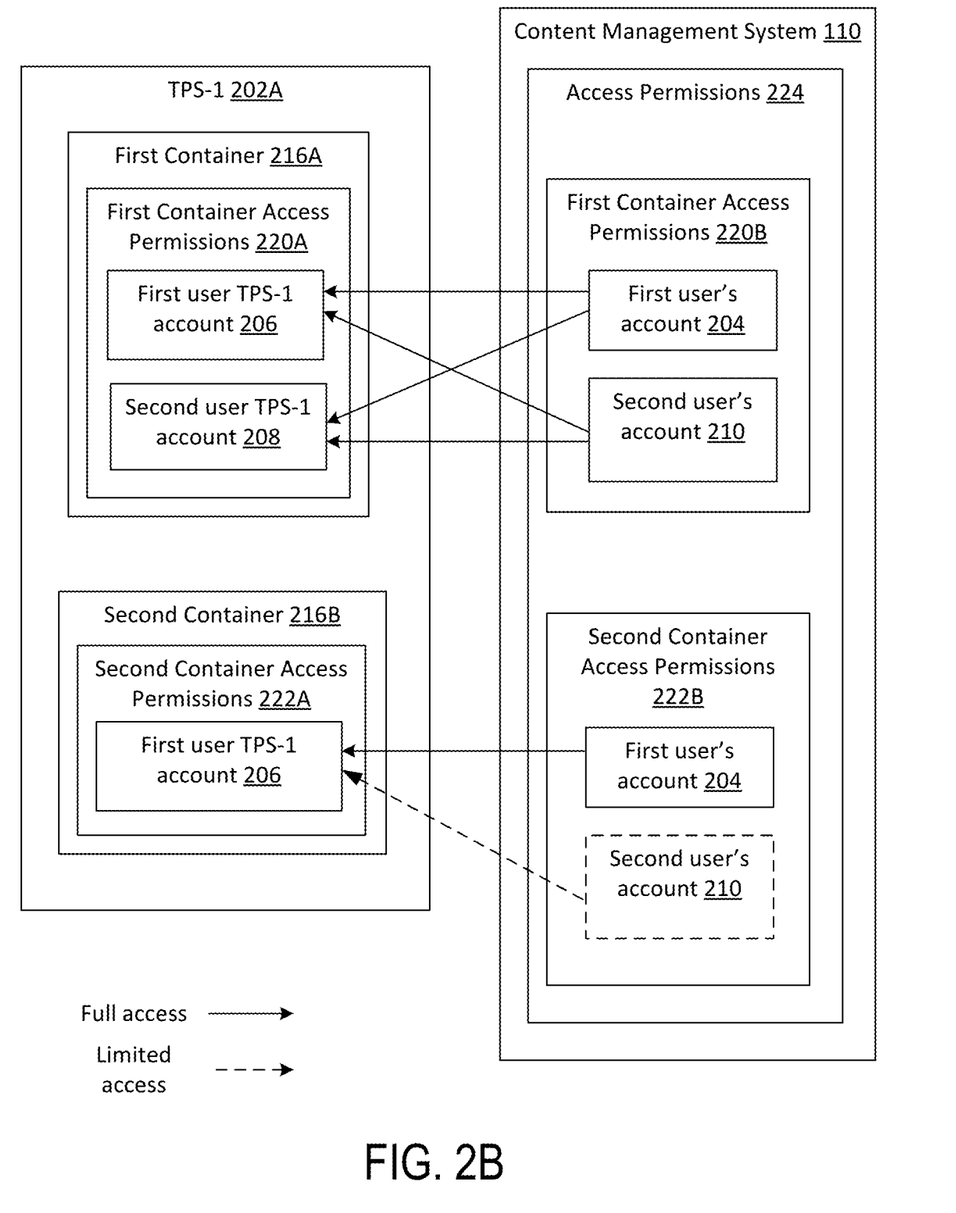
FIG. 2B shows an example embodiment of access permissions at the content management system and third-party services in accordance with some aspects of the present technology.

In association with the exemplary mapping of the user accounts in FIG. 2A, FIG. 2B shows how content management system access permissions 224, which may be located at or associated with server library 147 at content management system 110, may correlate access permissions for user accounts at content management system 110 with respect to containers 216 at third-party services 202. For example, first third-party service (TPS-1) 202A may comprise first container 216A having first container access permission 220A and second container 216B having second container access permission 222A. Because first container access permissions 220A at first third-party service 202A were granted to first user's TPS-1 account 206 and second user's TPS-1 account 208, as shown in FIG. 2B, first container access permission 220B at content management system 110 may allow full access to first user's account 204 and second user's account 210, with respect to activities at first container 216A, where allowing full access to a user account of the content management system 110 may include providing, in the activity feed of the content management system 110, detailed information about the activity occurring at the first container 216A (e.g., a name of the first container 216A, a link to the first container 216A, information associated with users of the TPS-1 202A that have access to the container, information associated with one or more users of the TPS-1 202A that were involved in the activity associated with the content item, etc.).

When it comes to a user that has access to a content item of the content management system 100 but does not have access to a container at third-party service 202 in which activity related to the content item occurred, the activity feed at content management system 110 for the user may reflect the user access permissions at third-party service 202. As exemplified in FIG. 2B, for second container 216B, second container access permission 222A indicates that first user's TPS-1 account 206 has access permissions to second container 216B and therefore, second container access permission 222B allows for full access permission for first user's account 204 with respect to activities at second container 216B but only limited access permissions for second user's account 210 since there is no user account with access permissions to second container 216B at first third-party service 202A that is associated with second user's account 210. Limited access permissions may allow for redacted activity information to be shared or no activity information to be shared at the activity feed depending on the access settings at third-party service 202 and/or content management system 110 (e.g., providing generalized information about the activity occurring in second container 216B without providing a link to the second container 216B).

Figure 3A:
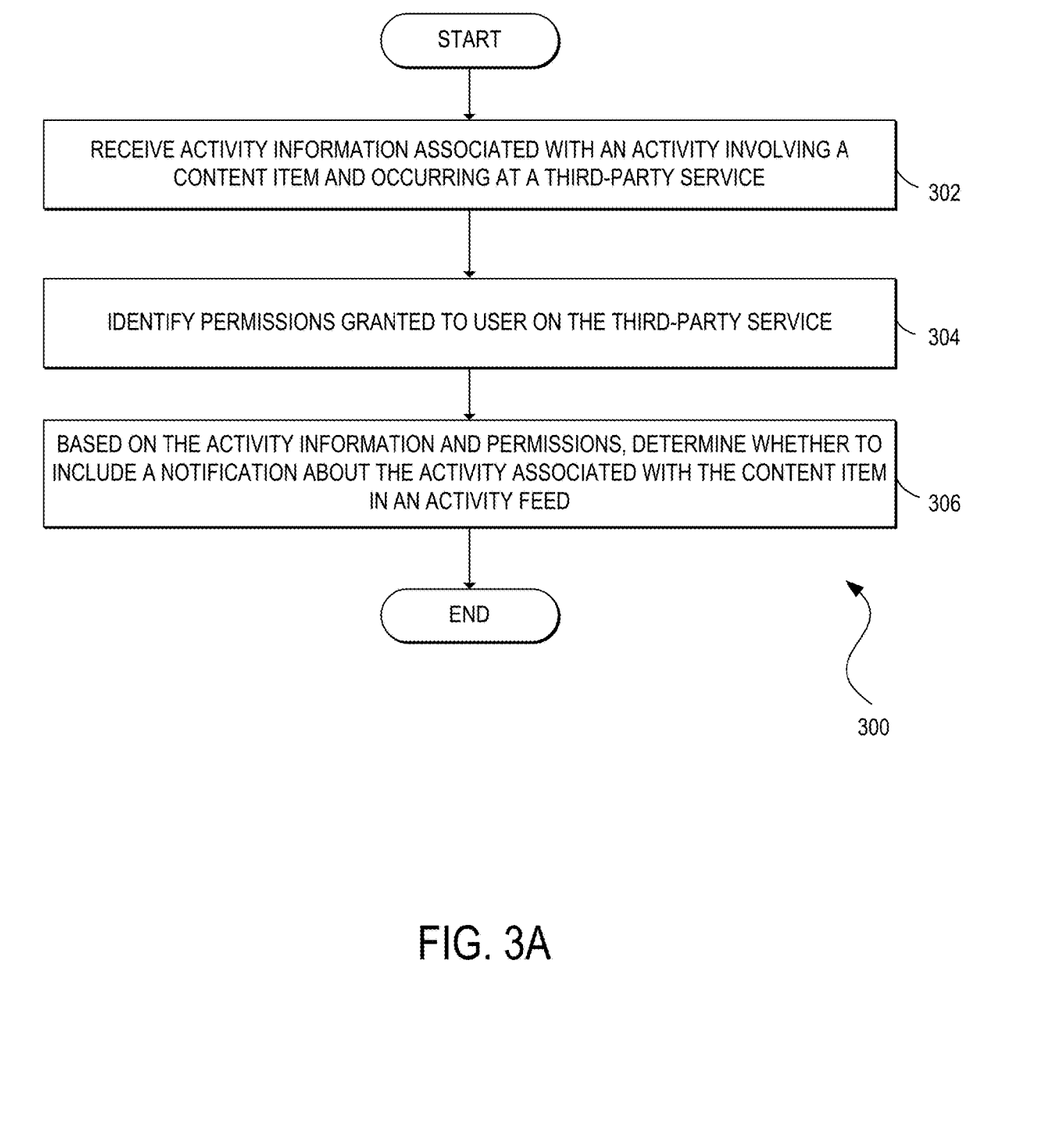
FIGS. 3A, 3B, and 3C show example method embodiments for providing activity information to an activity feed for a content item managed by the content management system in accordance with some aspects of the present technology.
Figure 3B:
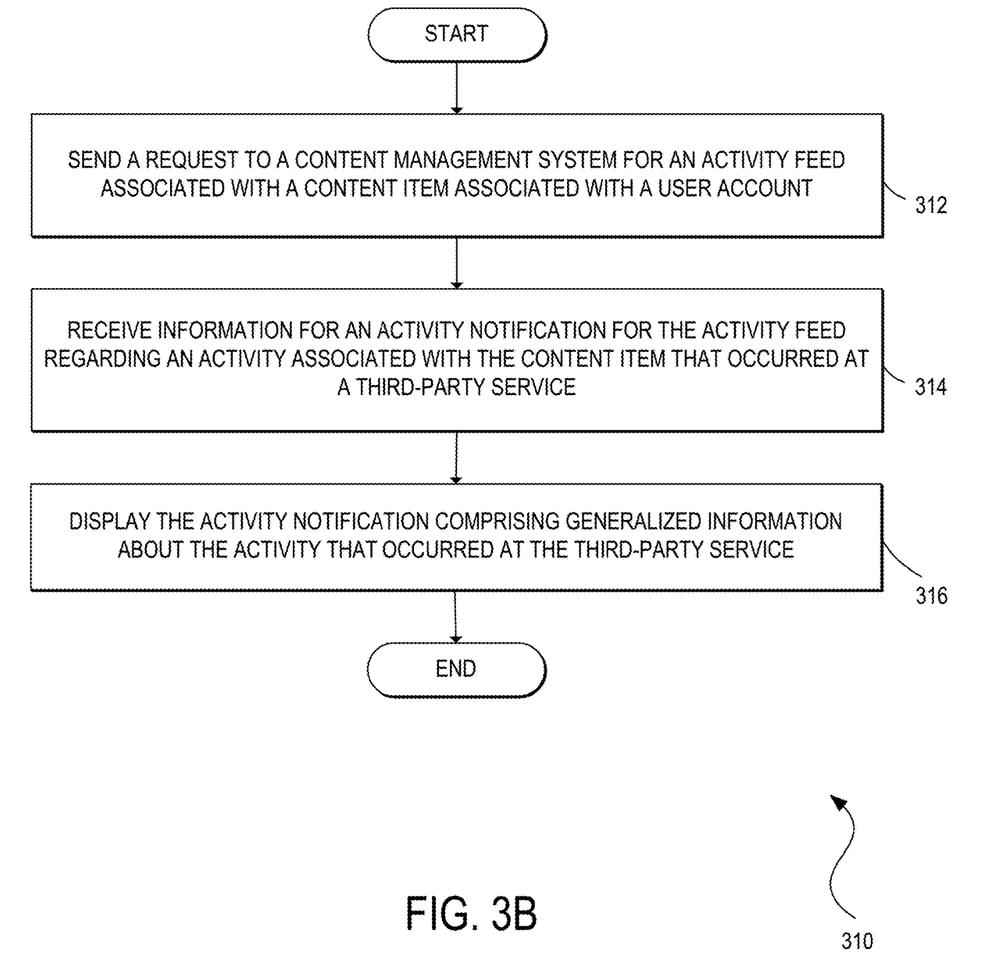
Figure 3C:
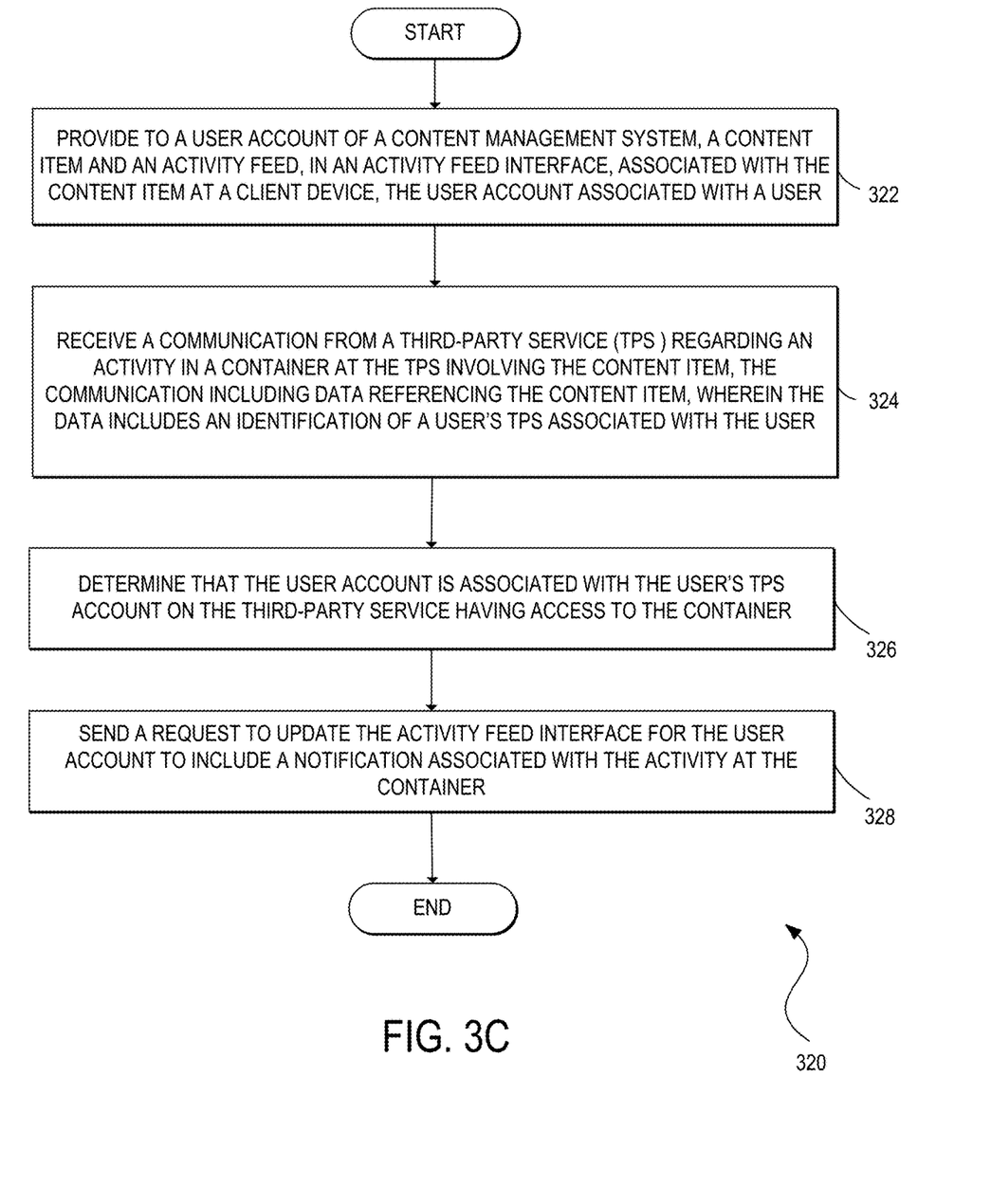

FIGS. 3A, 3B, and 3C illustrate example methods 300, 310, 320, respectively, for populating activity feed interface 414 (see FIG. 4) with activities from third-party service 202. The methods illustrated in FIGS. 3A, 3B, and 3C should not be limited by aspects depicted in the user interface 404 illustrated in FIG. 4, and likewise aspects of FIG. 4 should not be limited by the methods illustrated in FIGS. 3A, 3B, and 3C.

FIG. 3A begins when client activity feed service 136 may receive (302) a notification for an activity associated with a content item on third-party service 202 wherein the content item may be managed by content management system 110 and accessible by a user. Activity feed service 136 may then identify (304) permissions granted to the user on third-party service 202, the user being one whom for the activity feed is to be displayed, and based on the activity information and permissions granted to the user on third-party service 202, determine (306) whether to include an activity notification about the activity (e.g., activity notification 406A) within activity feed interface 414 (see FIG. 4).

Activity feed service 136 can identify permissions by providing credentials associated with the user to third-party service 202 and receiving data from third-party service 202 through an API to obtain container information about containers at third-party service 202 to which the user has access. The permissions granted to the user pertain to whether the user is included in a container at third-party service 202 in which the activity associated with the content item occurred. Content management system 110 may maintain a mapping at server library 147 between users at third-party service 202 that share user credentials with users at content management system 110 and reference the mapping to determine whether the user included in the container is mapped to the user at the content management system 110. The mapping can also be used to identify the third-party user account that corresponds with the content management system user account, and the identified third-party user account can be sent to the third party through an API along with the information about the container so that the third party can determine whether the third-party user account has access to the container and notify the content management system accordingly.

FIG. 3B exemplifies a method wherein client device 150 may send a request to content management system 110 for an activity feed associated with the content item and receive information related to the activities associated with the content item to be included in activity feed interface 414. FIG. 3B begins when client activity feed service 136A at client device 150 sends (312) a request to content management system 110 for an activity feed associated with a content item that is managed by content management system 110. Client activity feed service 136A at client device 150 may then receive (314) information regarding an activity associated with the content item that occurred at third-party service 202. Client device 150 may then display (316) an activity notification (e.g., activity notification 406A) comprising information about the activity that occurred at the third-party service 202.

FIG. 3C illustrates a method for providing an activity notification regarding an activity occurring in a container at third-party service 202 where an activity notification identifies the content item and a TPS account having access to the container that is also associated with a user account of the content management system 110. FIG. 3C begins when content management system 110 may provide (322) to a user account of content management system 110, a content item and an activity feed, in activity feed interface 414, associated with the content item at client device 150. Content management system 110 may receive (324) a communication from third-party service 202 regarding an activity in container at third-party service 202 involving the content item. The communication can include data referencing the content item and an identification of a user's TPS account at third-party service 202 that is associated with the user. The activity may occur in a container at third-party service 202, and the user may be associated with the user's TPS account that has access to the container. Content management system 110 may determine (326) that the user account is associated with the user's TPS account at third-party service 202 having access to the container. Content management system 110 may send (328) a request to update activity feed interface 414 (see FIG. 4) for the user account to include an activity notification (e.g., activity notification 406) associated with the activity at the container 216. The activity notification may further comprise a link to the activity in the container at third-party service 202. The activity can be the user's own activity in the container at third-party service 202 or an activity by another user having access to the container at third-party service 202.

Figure 4:
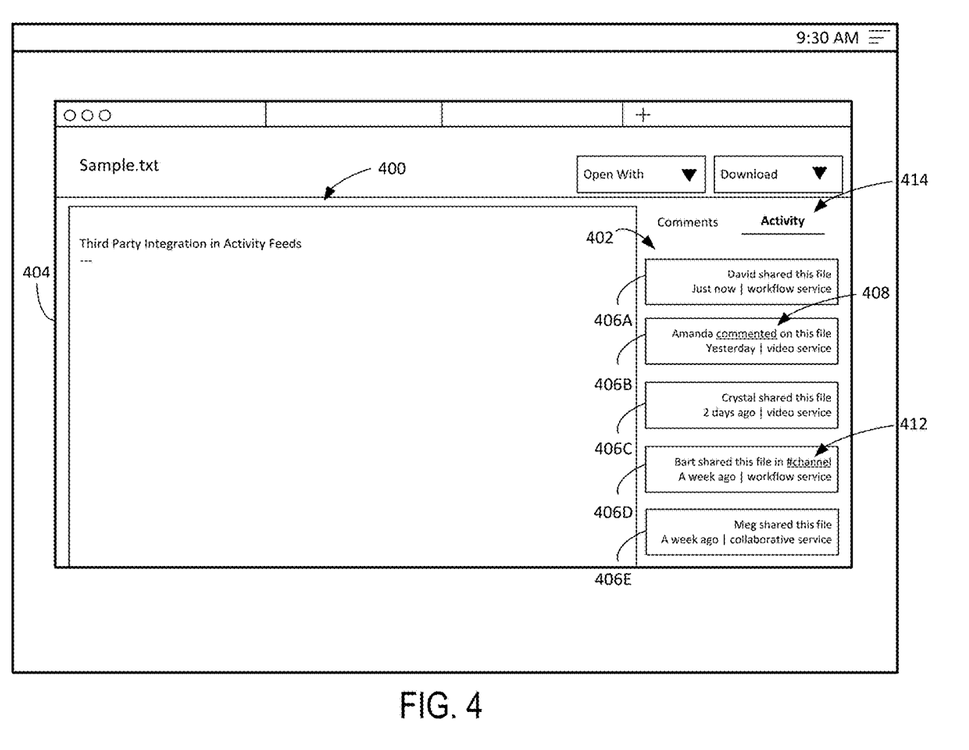
FIG. 4 shows an example user interface for providing an activity feed in accordance with some aspects of the present technology.

FIG. 4 illustrates an example of user interface 404 comprising content item 400 and contextual pane 402 associated with the content item. The contextual pane 402 may include any contextual information associated with content item 400 provided in user interface 404. For example, the contextual pane 402 can display comments associated with content item 400 when the comments tab is selected and activities associated with the content item when the activity tab is selected (as shown in FIG. 4). In some examples, contextual pane 402 can display presence, access, and seen state information for each user having access to the content item. Presence information refers to whether one of the particular users having access to the content item is currently accessing the content item. Access information refers to the type of access a user has to the content item. Seen state information refers to when the content item was last viewed by a particular user. As shown in FIG. 4, when the activity tab is selected within contextual pane 402, an activity feed interface 414 associated with a content item is provided.

The user interface 404 may be provided to a user that may have an account with content management system 110 and be logged in to the user's content management system account on client application 152. User interface 404 may be provided to the user in response to the user selecting a content item to be viewed (e.g., the user selecting Sample.txt as shown in FIG. 4).

User interface 404 may be any user interface for providing a content item managed by content management system 110. For example, user interface 404 may be an interface of a file browsing application provided by content management system 110, a client application provided by content management system 110, or a web browser accessing a web page managed by content management system 110.

When contextual pane 402 provides activity feed interface 414, activity feed interface 414 shows activity notifications 406A, 406B, 406C, 406D, 406E regarding activities at third-party services 202 associated with content item 400 displayed in user interface 404.

While FIG. 4 illustrates activity notifications 406A, 406B, 406C, 406D, 406E in activity feed interface 404, it should be appreciated that activity notifications 406A, 406B, 406C, 406D, 406E or any other listing of activity notifications can be presented in other parts of the graphical user interface other than activity feed interface 404. For example, activity notifications may be displayed as a standalone panel or integrated into the content item. In some embodiments, information displayed in contextual pane 402 can be alternatively displayed in other parts of user interface 404, or can be redundantly displayed in other parts of user interface 404.

In some embodiments, activity notifications about activities associated with content item 400 may be included in activity feed interface 414 when the mapping stored in server library 147 indicates that the user is included in the container or when the third party service 202 indicates the user is included in the container, and activity notifications may be excluded from activity feed interface 414 when the user is not included in the container.

When various activities are occurring at the containers, content management system 110 may receive data and metadata regarding the activities from third-party services 202 and instruct client device 150 to update activity feed interface 414 for the content item to include associated activity notifications for the respective user account based on user permissions. The activity feed may be updated with activity notifications, which may be visual indicators that include activity information about the activities.

FIG. 4 illustrates example types of information that may be included in activity notifications for content items in activity feed interface 414. Activity notification 406A indicates that a second user David has just shared content item 400 in a third party service that is a workflow service, wherein the container in which the content item was shared is not visible, meaning that the user viewing user interface 404 may not have access to such container. Activity notification 406B indicates that a third user Amanda has commented on content item 400 within a container of a third party service that is a video service. Activity notification 406B provides link 408 that links to the comment provided in the container of the video service because the container in which the comment was made at the video service is accessible by the user viewing user interface 404. Activity notification 406C indicates that a fourth user Crystal shared content item 400 in the video service. Activity notification 406C does not include a link to the container in which the content item was shared because the user viewing user interface 404 may not have access to the container. Activity notification 406D indicates that a fifth user Bart shared the content item 400 in a container that is #channel 412 of the workflow service, where the activity notification 406D provides a link to #channel 412, meaning that the user viewing user interface 404 has access to #channel. Activity notification 406E indicates that a sixth user Meg shared the content item 400 in a third party service that is a collaborative service, wherein the container in which content item 400 was shared is not visible, meaning that the user viewing user interface 404 may not have access to the container.

Figure 5:
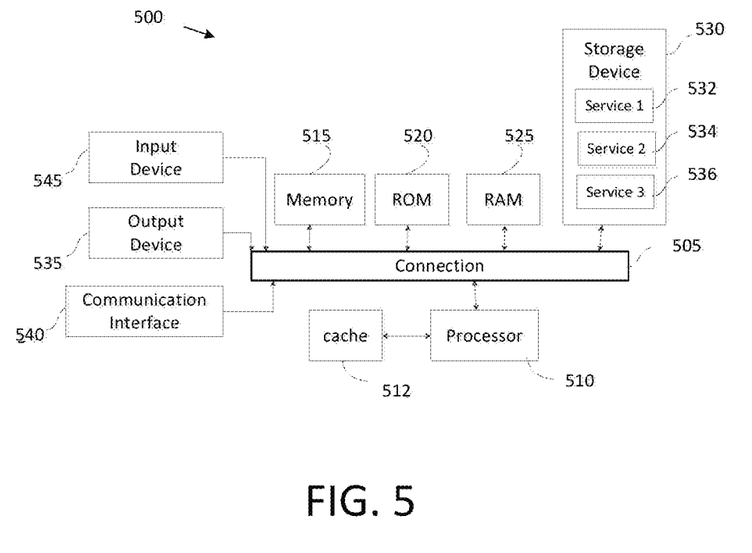
FIG. 5 shows an example of a system for implementing some aspects of the present technology.

FIG. 5 shows an example of computing system 500, which can be, for example, any computing device making up client device 150, content management system 110, activity feed service 136 or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) 520 and random access memory (RAM) to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for providing an activity feed by a content management system comprising:
   receiving activity information associated with an activity involving a content item, the activity involving the content item occurring at a third-party service, wherein the content item is managed by the content management system and accessible by a user, the content management system being associated with a platform different from the third-party service;
   identifying permissions granted to the user on the third-party service by maintaining a mapping at a server library at the content management system between a user account at the third-party service and a user account of the content management system, and referencing the mapping to determine whether the user account of the third-party service is mapped to the user account at the content management system; and
   based on the activity information and the permissions, providing an activity notification about the activity associated with the content item within an activity feed interface provided by the content management system.

2. The computer-implemented method of claim 1, wherein the identifying permissions further comprises providing credentials associated with the user to the third-party service and receiving container information about a container at the third-party service to which the user has access based on the credentials, wherein the activity information is specific to the container.

3. The computer-implemented method of claim 1, wherein the activity information is received from the third-party service via a webhook or an event API, wherein the activity information contains references to the content item.

4. The computer-implemented method of claim 1, wherein the permissions granted to the user pertain to permissions granted to a user account associated with the user for a container at the third-party service in which the activity associated with the content item occurred.

5. The computer-implemented method of claim 1, wherein the activity notification is included in the activity feed interface viewable by the user account of the content management system when the mapping indicates that the user account at the third-party service has access to a container at the third-party service in which the activity occurred, and wherein the activity notification about the activity is excluded from the activity feed interface when the mapping indicates that the user does not have access to the container.

6. The computer-implemented method of claim 5, wherein the activity notification about the activity includes a link to the activity on the third-party service when the mapping indicates that the user has access to the container.

7. The computer-implemented method of claim 5, wherein at least one detail from the activity information is obscured from the activity notification in the activity feed interface viewable by the user account of the content management system when the mapping indicates that the user does not have access to the container.

8. A non-transitory computer-readable storage medium comprising instructions stored thereon, wherein, when executed, the instructions cause one or more processors to:
send a request to a content management system for an activity detail associated with a content item associated with a user account of the content management system, wherein the content item is managed by the content management system and the user account is associated with a user;
receive the activity detail regarding an activity associated with the content item that occurred at a third-party service, the third-party service being associated with a platform different from the content management system; and
cause display of the activity detail about the activity that occurred at the third-party service, wherein the activity detail is displayed in an activity feed interface associated with the content management system,
wherein the activity detail is received based on permissions granted to the user's third-party service (TPS) account for a container at the third-party service in which the activity associated with the content item occurred, the permissions being identified by maintaining a mapping at a server library at the content management system between the user account and the user's TPS account, and referencing the mapping to determine whether the user's TPS account is mapped to the user account at the content management system.

9. The non-transitory computer-readable storage medium of claim 8, wherein the activity detail further comprises information about the container.

10. The non-transitory computer-readable storage medium of claim 9, wherein the activity detail further comprises a link to the activity in the container at the third-party service.

11. The non-transitory computer-readable storage medium of claim 8, wherein the activity feed interface is displayed adjacent to a preview of the content item.

12. The non-transitory computer-readable storage medium of claim 8, wherein the activity detail pertains to sharing the content item at the third-party service.

13. A system comprising:
one or more processors; and
a non-transitory computer-readable medium storing instructions that, when executed by the one or more processors, cause the one or more processors to:
provide, to a user account of a content management system, a content item and an activity feed in an activity feed interface associated with the content item, the user account associated with a user, the content management system being associated with a platform different from a third-party service;
receive an activity detail from the third-party service regarding an activity in a container at the third-party service involving the content item, the activity detail including data referencing the content item and an identification of a user's third-party service (TPS) account at the third-party service, wherein the user's TPS account is associated with the user;
determine that the user account is associated with the user's TPS account at the third-party service having access to the container by maintaining a mapping at a server library at the content management system between the user account and the user's TPS account, and determining that the user's TPS account having access to the container is mapped to the user account; and
send, to a client device associated with the user account, a request to update the activity feed interface for the user account to include the activity detail associated with the activity at the container.

14. The system of claim 13, wherein the activity detail is received via a webhook or an event API.

15. The system of claim 13, wherein the activity is sharing or commenting on the content item at the third-party service.

16. The system of claim 13, wherein the activity detail about the activity includes a link to the activity on the third-party service.

17. The system of claim 13, wherein the activity feed interface displays the activity feed adjacent to a preview of the content item.

18. The system of claim 13, wherein when a second user's TPS account at the third-party service does not have access to the container, a second user account at the content management system associated with the second user's TPS account has access to redacted information about an activity associated with the content item at the container.

* * * * *